(12) United States Patent
Suzuki

(10) Patent No.: US 8,056,002 B2
(45) Date of Patent: Nov. 8, 2011

(54) IMAGE FORMING APPARATUS, IMAGE FORMING METHOD, COMPUTER PROGRAM, AND COMPUTER-READABLE STORAGE MEDIUM

(75) Inventor: Akira Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1252 days.

(21) Appl. No.: 11/139,290

(22) Filed: May 27, 2005

(65) Prior Publication Data

US 2005/0264847 A1 Dec. 1, 2005

(30) Foreign Application Priority Data

Jun. 1, 2004 (JP) .................... 2004-163349

(51) Int. Cl.
*G06F 17/00* (2006.01)
(52) U.S. Cl. ........ 715/243; 715/704; 715/810; 715/235; 358/1.18
(58) Field of Classification Search .................. 715/203, 715/272, 242–243, 273–277
See application file for complete search history.

(56) References Cited

U.S. PATENT DOCUMENTS

| | | | |
|---|---|---|---|
| 5,848,430 A * | 12/1998 | Takakura et al. ............. | 715/202 |
| 7,257,770 B2 | 8/2007 | Narahara | |
| 7,325,187 B2 | 1/2008 | Yashiro et al. | |
| 2002/0007367 A1 | 1/2002 | Narahara | |
| 2004/0025116 A1 | 2/2004 | Yashiro et al. | |
| 2004/0177316 A1* | 9/2004 | Layzell et al. ................ | 715/500 |
| 2005/0097448 A1* | 5/2005 | Giannetti et al. ............ | 715/508 |
| 2008/0094420 A1* | 4/2008 | Geigel et al. .................. | 345/660 |

FOREIGN PATENT DOCUMENTS

| | | |
|---|---|---|
| JP | 10-171809 A | 6/1998 |
| JP | 10-207895 A | 8/1998 |
| JP | 2001-290805 A | 10/2001 |
| JP | 2002-032364 A | 1/2002 |
| JP | 2004-062600 A | 2/2004 |

* cited by examiner

*Primary Examiner* — Quoc A Tran
(74) *Attorney, Agent, or Firm* — Canon USA Inc. IP Division

(57) ABSTRACT

An image forming apparatus for performing image forming processing of a structured document after analyzing the structured document into a tree structure including a plurality of element blocks includes a controller and an image forming device. The controller is adapted to analyze the structured document input from an inputting unit and to convert the analyzed structured document into image forming data by placing each element block of the plurality of element blocks in a predetermined position. The image forming device is adapted to perform forming an image in accordance with the image forming data prepared by the controller. The controller places the plurality of element blocks in a predetermined order in accordance with respective style specifications, the predetermined order being independent of an order of appearance of the plurality of element blocks. Therefore, the entire layout processing is significantly simplified.

8 Claims, 5 Drawing Sheets

NOTE: NUMBERS IN CIRCLES INDICATE ORDER OF PLACEMENT

NOTE: NUMBERS IN CIRCLES INDICATE ORDER OF PLACEMENT

IMAGE FORMING APPARATUS, IMAGE FORMING METHOD, COMPUTER PROGRAM, AND COMPUTER-READABLE STORAGE MEDIUM

BACKGROUND OF THE INVENTION

1. Field of the Invention

The present invention relates to an image forming apparatus, an image forming method, a computer program, and a computer-readable storage medium. In particular, the present invention relates to a technique suitable for image forming data content delivered via digital broadcasting or data communications, including communications over the Internet.

2. Description of the Related Art

Data content written in markup languages, such as an extensible hypertext markup language (XHTML), is interpreted and printed using computers capable of handling large-scale resources. Since such usage is intended to display the content on display units, only a limited area to be displayed is required to be processed, and therefore temporary rendering is repeated.

For a printing system, unlike a display system described above, batch processing in which the overall content is interpreted and then distributed to each page enhances the processing more efficiently in the entire system.

Digital televisions, digital cameras, cellular phones, and the like, have been increasingly using data content written in markup languages. Since these devices have only limited resources (functional capabilities), there is a demand for avoiding a relayout process occurring in the process of conversion of the content to printing data.

Conventional techniques propose that at the time when a formatter formats a structured document in accordance with style data, position information regarding the structured document be conveyed to an additional-information producing unit. The additional-information producing unit associates the position information with each element of the structured document. The associated information and document type are superimposed as additional information on a document image by an additional-information superimposing unit. The document image is then printed by a printing unit. However, the above problem remains unsolved.

SUMMARY OF THE INVENTION

The present invention provides an image forming apparatus, an image forming method, a computer program, and a computer-readable storage medium capable of reducing the load on the image forming apparatus and capable of improving the efficiency of preparing image forming data when the image forming data is prepared from data content written in a structured document whose layout is not precisely defined.

In a first aspect of the present invention, an image forming apparatus for performing image forming processing of a structured document after analyzing the structured document into a tree structure including a plurality of element blocks includes a controller and an image forming device. The controller is adapted to analyze the structured document input from an inputting unit and to convert the analyzed structured document into image forming data by placing each element block of the plurality of element blocks in a predetermined position. The image forming device is adapted to perform forming an image in accordance with the image forming data prepared by the controller. The controller places the plurality of element blocks in a predetermined order in accordance with respective style specifications, the predetermined order being independent of an order of appearance of the plurality of element blocks.

In a second aspect of the present invention, an image forming method for performing image forming processing of a structured document after analyzing the structured document into a tree structure including a plurality of element blocks includes an inputting step, an analyzing step, a converting step, and an image forming step. The inputting step inputs the structured document whose layout is not precisely defined. The analyzing step analyzes the structured document input by the inputting step. The converting step converts the analyzed structured document into image forming data by placing each element block of the plurality of element blocks in a predetermined position. The image forming step performs forming an image in accordance with the image forming data prepared by the converting step. The converting step places the plurality of element blocks in a predetermined order in accordance with respective style specifications, the predetermined order being independent of an order of appearance of the plurality of element blocks.

In a third aspect of the present invention, a computer program performs image forming processing of a structured document after analyzing the structured document into a tree structure including a plurality of element blocks. The computer program makes an image forming apparatus execute an inputting step, an analyzing step, a converting step, and an image forming step. The inputting step inputs the structured document whose layout is not precisely defined. The analyzing step analyzes the structured document input by the inputting step. The converting step converts the analyzed structured document into image forming data by placing each element block of the plurality of element blocks in a predetermined position. The image forming step performs forming an image in accordance with the image forming data prepared by the converting step. The converting step places the plurality of element blocks in a predetermined order in accordance with respective style specifications, the predetermined order being independent of an order of appearance of the plurality of element blocks.

Further features and advantages of the present invention will become apparent from the following description of exemplary embodiments with reference to the attached drawings.

DESCRIPTION OF THE EMBODIMENTS

The embodiments of the present invention are described below with reference to the drawings. The embodiments are based on the specifications of extensible hyper text markup language 1.1 (XHTML™ 1.1) and cascading style sheet 2.0 (CSS™ 2.0), which are defined by world wide web consortium (W3C). The term "node and link structure" indicates the structure including items that can be separated into nodes and links, each link having at least two relevant nodes. The term "node and link relationship" indicates the relationship between elements on the basis of the paths of the nodes and the links of the elements.

One example of conventional processing of placing element blocks is first described with reference to FIG. 5.

Figure 5:
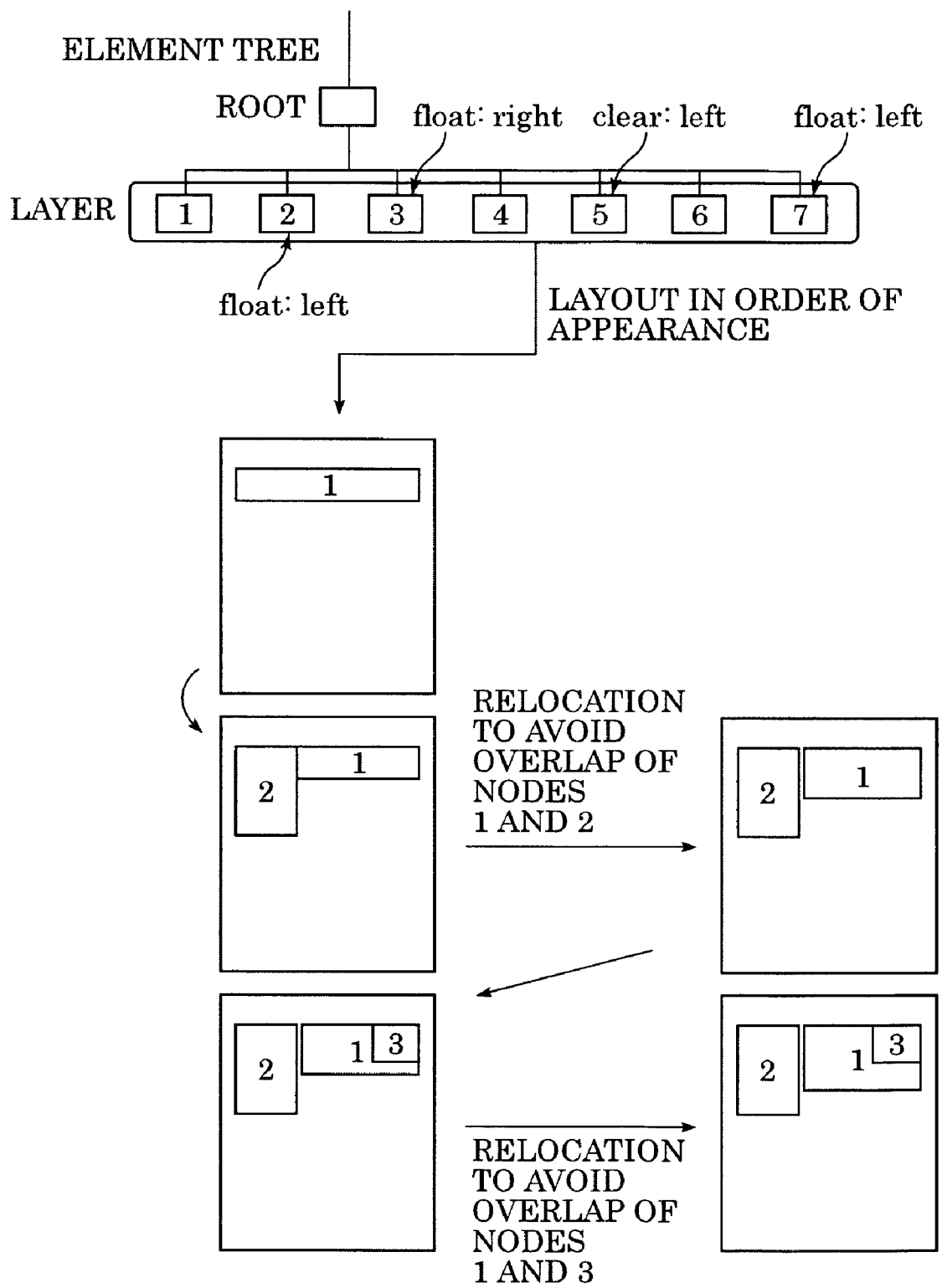
FIG. 5 shows an example of placement of element blocks in a conventional technique.

FIG. 5 shows conventional layout processing, in which element blocks obtained from analysis of a structured document, such as an XHTML document, are placed in order of appearance. In this processing, if an element with a tag indicating the float property appears, a relayout process is required. Such a relocation process to avoid overlaps of elements reduces efficiency.

The conventional layout processing at each step is described below.
(1) Node 1 is placed in accordance with its specification.
(2) Node 1 is aligned on the right while the shape of the block of Node 1 is changed, in order that Node 2 is placed so as to be aligned on the left. (Relocation of Node 1)
(3) Node 2 is placed.
(4) The shape of the block of Node 1 is changed in order that Node 3 is placed so as to be aligned on the right. (Relocation of Node 1)
(5) Node 3 is placed.

The subsequent placement process is not shown in FIG. 5 and is not described here. In this conventional placement processing, every time an element block with the "float attribute" for style appears, one or more other elements previously placed are relocated. Therefore, the layout processing is not efficiently performed in conventional techniques. The present invention overcomes such a disadvantage. The embodiments of the present invention are described below.

Figure 1:
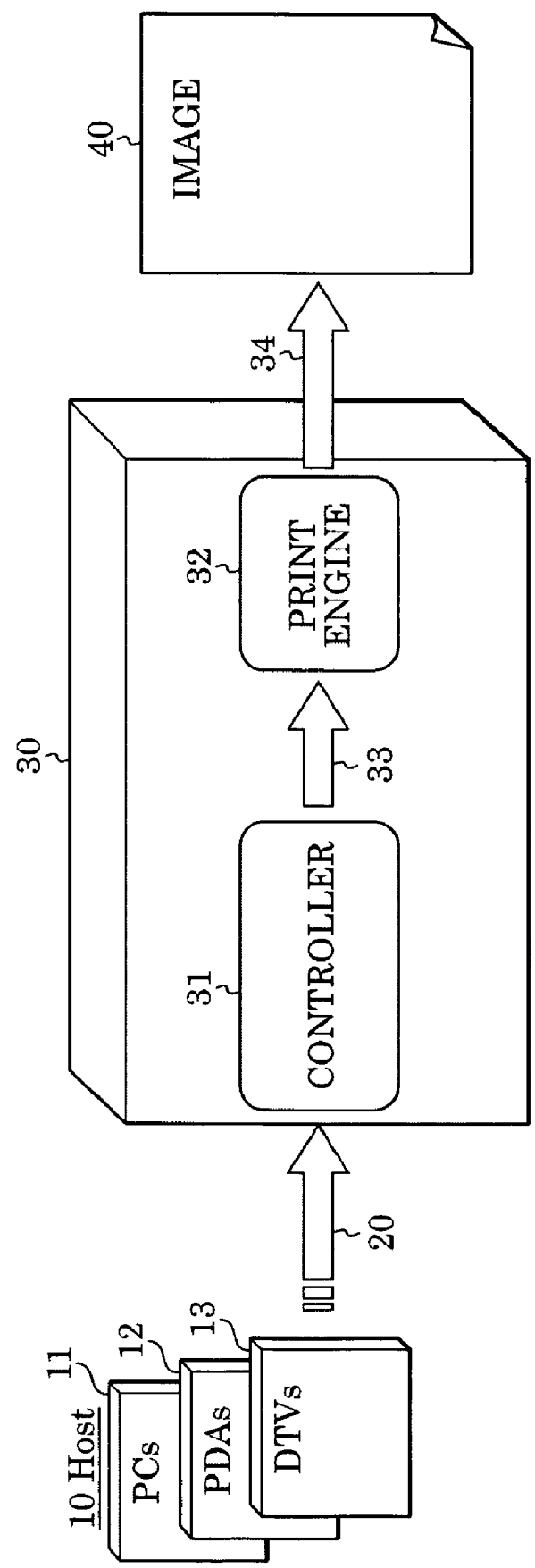
FIG. 1 shows the entire image forming system according to an embodiment of the present invention.

FIG. 1 shows the entire image forming system according to an embodiment of the present invention.

A controller 31 of a printing apparatus 30 as an image forming apparatus analyzes the content (structured document) 20 input from a personal computer (PC) 11, a personal digital assistant (PDA) 12, a digital broadcasting device 13, or the like, which are collectively referred to as a host computer 10, via a wired or wireless connection.

After converting the structured document into a tree structure in which each analyzed element corresponds to each node, the controller 31 determines the layout and converts the structure into printing data 33 as image forming data. A print engine 32 as an image forming device creates an image on printing paper as a medium 40 in accordance with the printing data 33 by performing a printing processing 34. In exemplary embodiment, the controller 31 is composed of a single-board computer including a central processing unit (CPU) for executing a program, a storage unit storing the program, and an interface.

Figure 2:
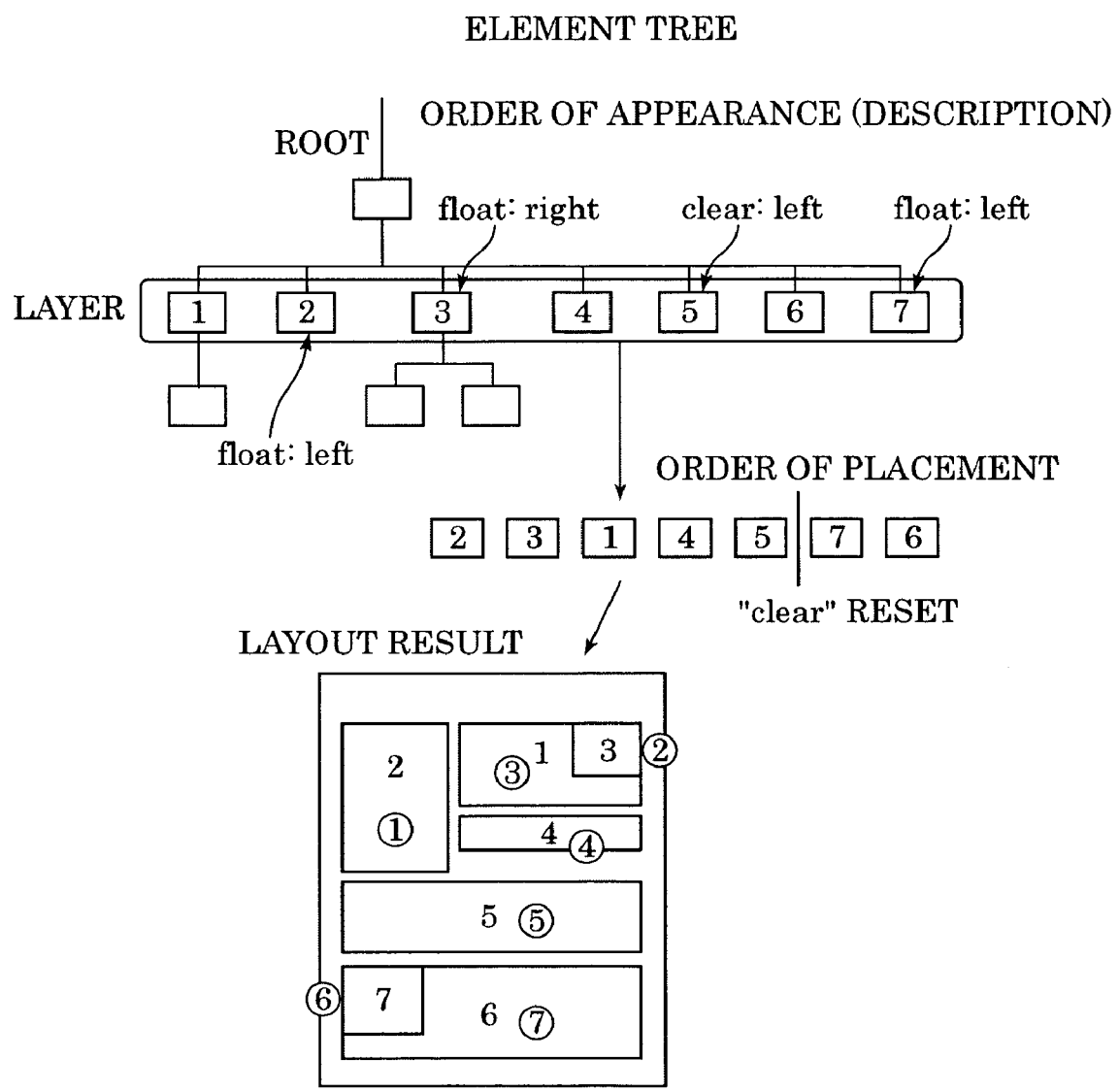
FIG. 2 shows the relationship between the order of appearance of elements and the layout processing according to the embodiment.

FIG. 2 shows the relationship between the order of appearance of elements and the layout processing according to the embodiment.

In this embodiment, the placement of elements is performed independently of an order of appearance of elements, and an element with the float attribute (in style tag) is prioritized. One or more elements are then placed in the space around the floating element. This method makes the layout processing easier.

The term "tag" indicates a special character string to specify a way of displaying text or the like in a text file. In order to distinguish the tags from the text proper to be displayed, the tags are represented as one or more particular characters and/or symbols enclosing the text proper. In HTML documents, which are used for writing Web pages, the structures of the documents, the layouts, and the links are represented using the tags.

FIG. 2 shows nodes and links obtained from a structured document subjected to lexical analysis, syntactic analysis, and semantic analysis. In particular, the procedure of determining an order of placement of nodes (elements) in a layer under a root is shown. In this example, Nodes 1 to 7 correspond to order of description in the structured document. Nodes 2, 3, and 7 have the float attribute, and Node 5 has the clear attribute, which indicates cancellation of the float attribute. The placement procedure according to the embodiment is described below with the assumption that Nodes 2, 3, and 7 are element blocks composed of images and other Nodes are element blocks composed of text.

(1) Node 2 is placed so as to be aligned on the left in accordance with its specification reading "float: left".
(2) Node 3 is placed so as to be aligned on the right in accordance with its specification reading "float: right".
(3) Node 1 is placed so as to flow into a gap between Nodes 2 and 3 previously placed.
(4) Node 4 is placed to be positioned under Node 1 in a similar fashion.
(5) Node 5 is placed so as not to interfere with Node 2 in accordance with its specification reading "clear: left".
(6) Node 7 is placed so as to be aligned on the left in accordance with its specification reading "float: left".
(7) Node 6 is placed so as not to overlap Node 7 previously placed.

Figure 3:
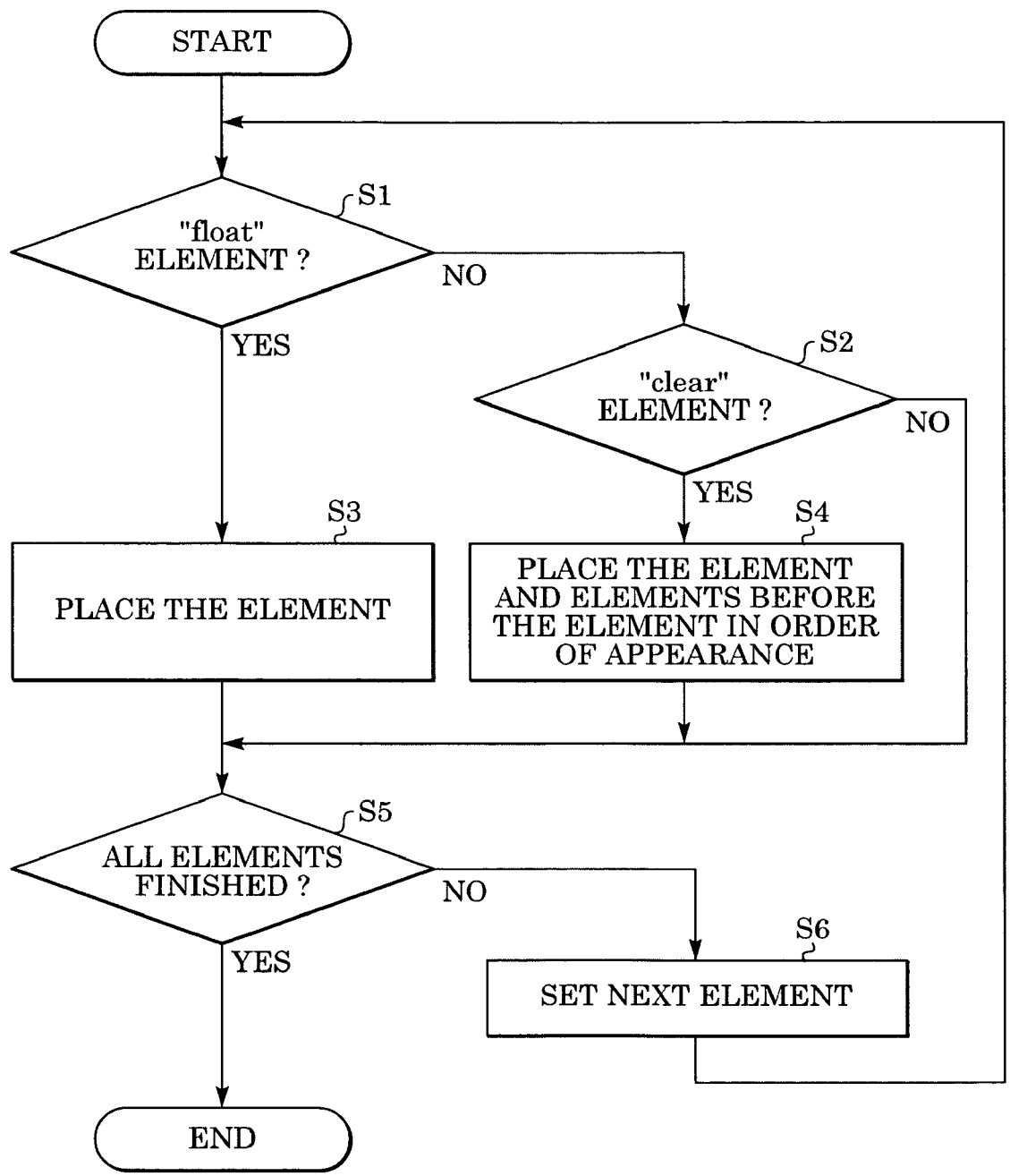
FIG. 3 is a flowchart showing the processing according to the embodiment.

FIG. 3 is a flowchart showing the operation of the controller 31 of the procedure of processing according to the embodiment.

In step S1, the controller 31 determines whether a target element has the float attribute. If the element is determined not to have the float attribute, the processing proceeds to step S2. If the element is determined to have the float attribute in step S1, the processing moves to step S3.

In step S2, the controller 31 determines whether the element has the clear attribute. If the element is determined to have the clear attribute in step S2, the processing moves to step S4, where the controller 31 performs processing for the appearance of the element with the clear attribute. In this case, the controller 31 places elements that do not have the completion markers before the element with the clear attribute, i.e., elements waiting for placement, and the element with the clear attribute in order of appearance. Processing then proceeds to step S5.

In step S3, the element with the float attribute is placed and then marked with a completion marker (not shown) indicating that the placement of the element is finished. Processing then proceeds to step S5.

In step S5, the controller 31 determines whether placement of all elements in the target layer is finished. If an element remains to be placed, the processing moves to step S6. In step S6, the next target element is determined in order to scan the element, and the processing then moves to step S1 and the processing described above is repeated for the new target element. If the placement of all elements is determined to be finished in step S5, the processing is completed. According to the process described above, the placement of the element blocks in the target layer is determined.

Figure 4:
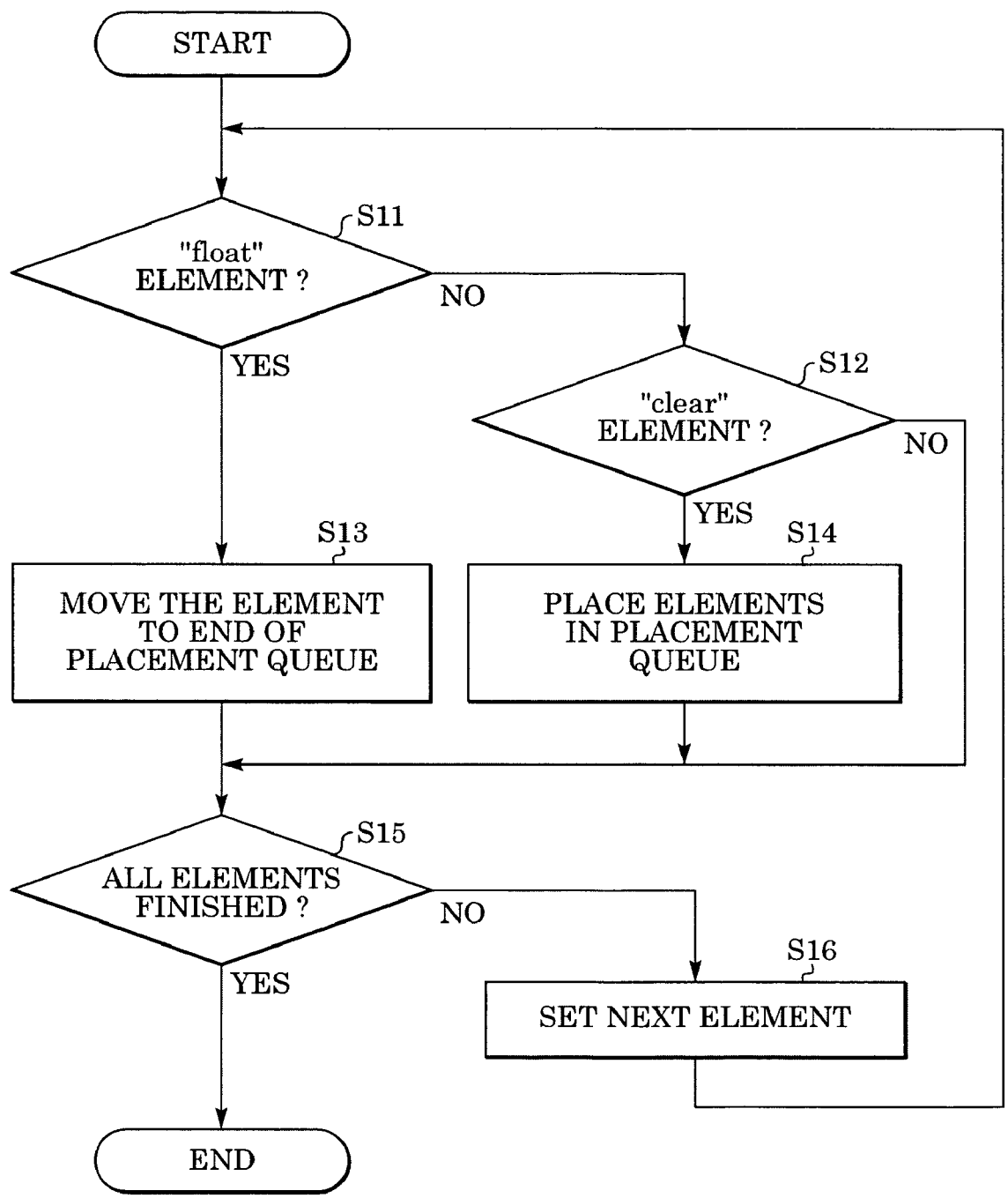
FIG. 4 is a flowchart showing another example of the processing according to the embodiment.

Another embodiment is described with reference to the flowchart of FIG. 4.

In step S11, it is determined whether a target element has the float attribute. If the element is determined not to have the float attribute, the processing moves to step S12. If the element is determined to have the float attribute, the processing moves to step S13.

In step S12, it is determined whether the element has the clear attribute. If the element is determined to have the clear attribute, the processing moves to step S14, where the controller 31 performs processing for the appearance of the element with the clear attribute. In this case, the controller 31 places elements in a placement queue in order in which they are linked. Processing then moves to step S15.

In step S13, which is a case when the element is determined in step S11 to have the float attribute, the controller 31 links the element having the float attribute to the end of the placement queue (not shown) and marks the completion marker (not shown) on the element. Processing then moves to step S15.

In step S15, the controller 31 determines whether the placement of all elements in the target layer is finished. If an element remains to be placed, the processing moves to step S16. In step S16, the next target element is determined in order to scan the element, and the processing then moves to step S11 and the processing described above is repeated for the new target element. If the placement of all elements is determined to be finished in step S15, the processing is completed. According to the process described above, the placement of the element blocks in the target layer is determined.

According to one aspect of the embodiments, in a process of printing a structured document whose layout is not precisely defined after the structured document is arranged into a parse tree including a plurality of element blocks, the plurality of element blocks obtained from analysis of the structured document is laid out in such a way that an element block with the float attribute of the plurality of element blocks is prioritized. Since printing is performed on a medium in accordance with printing data prepared by the conversion, each element block can be placed in a predetermined order independent of an order of appearance of the plurality of element blocks. As a result, the entire layout processing can be significantly simplified, thus improving the efficiency of preparing the printing data.

According to another aspect of the embodiments, a layout structure in a parse tree is used. Therefore, in a process of interpreting data content written in a markup language and preparing printing data, the load on a printing apparatus is reduced, so that the efficiency of processing can be greatly improved.

Other Embodiments

The present invention includes an embodiment in which program code of a software program to realize the features of the embodiments described above is supplied to a computer of an apparatus or system connected to devices and the devices are operated in accordance with the program stored in the computer (CPU (central processing unit) or MPU (microprocessing unit)) so that the features of the embodiments described above are realized.

In this case, since the program code of the software program realizes the features of the embodiments described above, both the program code and a unit for supplying the program code to a computer, e.g., a storage medium storing the program code are included in the present invention. Examples of the storage medium storing the program code include a floppy disk, a hard disk, an optical disk, a magneto-optical disk, a compact disc read-only memory (CD-ROM), a magnetic tape, a nonvolatile memory card, and a read-only memory (ROM).

In addition, such program code is included in the embodiments of the present invention in a case where the features of the embodiments described above are realized by executing program code supplied by a computer and in a case where the features of the embodiments described above are realized by executing the program code in conjunction with an operating system (OS) running the computer and/or with another application software program.

Furthermore, the present invention includes an embodiment in which the features of the embodiments described above are realized by storing supplied program code in a memory included in an expansion board of a computer or included in an expansion unit connected to a computer and then performing actual processing in part or in entirety in accordance with instructions of the program code using a CPU or the like included in the expansion board or in the expansion unit.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-163349 filed Jun. 1, 2004, which is hereby incorporated by reference herein.

What is claimed is:

1. An image forming apparatus with a controller for performing image forming processing of a structured document including a plurality of element blocks, the image forming apparatus comprising:
    a first layout unit configured, by analyzing the plurality of element blocks in an appearance order of the structured document, (a) to lay out a first element block with a float attribute in the appearance order of the structured document, and (b) to keep a second element block without the float attribute from laying out until a third element block with a clear attribute appears;
    a second layout unit configured to lay out the kept second element block without the float attribute into a blank space around the laid out first element block without re-laying out the first element block, when the third element block with the clear attribute appears; and
    an image forming unit configured to generate, by the controller, image data to form an image based on the laid out first element block and the laid out second element block.

2. The image forming apparatus according to claim 1, wherein the image forming unit is a printing apparatus.

3. The image forming apparatus according to claim 1, wherein a property of the float attribute is at least one of right, left and both.

4. The image forming apparatus according to claim 1, wherein the image does not have any overlap between the first element block and the second element block.

5. An image forming method for performing image forming processing of a structured document including a plurality of element blocks, the image forming method comprising:
    analyzing the plurality of element blocks in an appearance order of the structured document, (a) to lay out a first element block with a float attribute in the appearance order of the structured document, and (b) to keep a second element block without the float attribute from laying out until a third element block with a clear attribute appears;

laying out the kept second element block without the float attribute into a blank space around the laid out first element block without re-laying out the first element block, when the third element block with the clear attribute appears; and generating image data to form an image based on the laid out first element block and the laid out second element block.

6. The image forming method according to claim 5, wherein generating data is performed by a printing apparatus.

7. A computer-readable medium having stored thereon a computer program for performing image forming processing of a structured document including a plurality of element blocks, the computer program making an image forming apparatus execute:

analyzing the plurality of element blocks in an appearance order of the structured document, (a) to lay out a first element block with a float attribute in the appearance order of the structured document, and (b) to keep a second element block without the float attribute from laying out until a third element block with a clear attribute appears;

laying out the kept second element block without the float attribute into a blank space around the laid out first element block without re-laying out the first element block, when the third element block with the clear attribute appears; and generating image data to form an image based on the laid out first element block and the laid out second element block.

8. The computer-readable medium according to claim 7, wherein generating data is performed by a printing apparatus.

* * * * *